(12) United States Patent
Hwang

(10) Patent No.: US 12,001,309 B2
(45) Date of Patent: Jun. 4, 2024

(54) METHOD AND APPARATUS FOR PREDICTING APPLICATION SERVICE RESPONSE TIME IN COMMUNICATION SYSTEM

(71) Applicant: ELECTRONICS AND TELECOMMUNICATIONS RESEARCH INSTITUTE, Daejeon (KR)

(72) Inventor: Jung Yeon Hwang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 76 days.

(21) Appl. No.: 17/700,153

(22) Filed: Mar. 21, 2022

(65) Prior Publication Data
US 2023/0053568 A1 Feb. 23, 2023

(30) Foreign Application Priority Data
Jul. 27, 2021 (KR) ........................ 10-2021-0098437

(51) Int. Cl.
*G06F 11/34* (2006.01)
*G06N 5/02* (2023.01)

(52) U.S. Cl.
CPC ........... *G06F 11/3409* (2013.01); *G06N 5/02* (2013.01)

(58) Field of Classification Search
None
See application file for complete search history.

(56) References Cited

U.S. PATENT DOCUMENTS

| 7,058,431 B2 | 6/2006 | Sasaki | |
| 7,703,079 B1* | 4/2010 | Burrows | G06F 11/3428 703/22 |

(Continued)

FOREIGN PATENT DOCUMENTS

| JP | 2010068367 A | 3/2010 |
| KR | 101264873 B1 | 5/2013 |

(Continued)

OTHER PUBLICATIONS

Jamal I. Daoud, "Multicollinearity and Regression Analysis," 2017, Journal of Physics Conference Series 949 012009, pp. 1-6, retrieved from https://iopscience.iop.org/article/10.1088/1742-6596/949/1/012009/pdf on Sep. 19, 2023. (Year: 2017).*

*Primary Examiner* — Tuan C Dao
*Assistant Examiner* — William C Wood
(74) *Attorney, Agent, or Firm* — Rabin & Berdo, P.C.

(57) ABSTRACT

The present disclosure relates to a method and apparatus for predicting application service response time in a communication system. Particularly, the present disclosure relates to a method, apparatus and system for predicting response time required to provide an application service to a user in response to the user's request of the application service in a server of a communication system. A method for predicting application service response time according to an embodiment of the present disclosure includes: data collection for collecting network data associated with a user application service, in response to a request for the application service by a user device; and data analysis for performing, by utilizing the collected data, a response time predictive analysis, in order to predict a user's application service response time. The data analysis selects an optimal prediction model by initially applying a response time prediction model and testing the initial prediction model that is applied.

15 Claims, 7 Drawing Sheets

(56) References Cited

U.S. PATENT DOCUMENTS

| | | |
|---|---|---|
| 10,855,616 B2 | 12/2020 | Morgan et al. |
| 2011/0208495 A1* | 8/2011 | Yuta ..................... G06F 18/214 |
| | | 703/2 |
| 2015/0341380 A1 | 11/2015 | Heo et al. |
| 2016/0218949 A1* | 7/2016 | Dasgupta ............ G06F 11/3409 |
| 2017/0149875 A1* | 5/2017 | Iyengar ............... H04L 41/5051 |
| 2020/0125390 A1 | 4/2020 | Kim et al. |
| 2021/0006503 A1 | 1/2021 | Morgan et al. |
| 2021/0334597 A1* | 10/2021 | Abelha Ferreira .... G06N 5/025 |
| 2022/0292315 A1* | 9/2022 | Banga ..................... G06N 5/01 |
| 2022/0327453 A1* | 10/2022 | Ran ....................... G06F 9/5083 |

FOREIGN PATENT DOCUMENTS

| | | |
|---|---|---|
| KR | 1020130085502 A | 7/2013 |
| KR | 1020170029666 A | 3/2017 |
| KR | 1020210039654 A | 4/2021 |

\* cited by examiner

FIG. 2

| container_cpu_usage_seconds_total |
|---|
| pod<br>container<br>namespace |
| value |

| container_network_transmit_bytes_total |
|---|
| pod<br>container<br>namespace |
| value |

| container_network_transmit_packets_total |
|---|
| pod<br>container<br>namespace |
| value |

| container_network_receive_bytes_total |
|---|
| pod<br>container<br>namespace |
| value |

| container_network_receive_packets_total |
|---|
| pod<br>container<br>namespace |
| value |

FIG. 3

|   | Variable name | Type | Explanation | NULL |
|---|---|---|---|---|
| 1 | TIME_STAMP | DATE | Collection time | X |
| 2 | NODE_ID | INTEGER | promethuse node id | X |
| 3 | NAMESPACE | VARCHAR | NAMESPACE | X |
| 4 | POD_NAME | VARCHAR | POD_NAME | X |
| 5 | CONTAINER_NAME | VARCHAR | CONTAINER_NAME | X |
| 6 | VALUE_TIME | DATE | Promethuse Response Time | O |
| 7 | VALUE_CPU_1 | FLOAT | CPU_USAGE | O |
| 8 | VALUE_CPU_2 | FLOAT | NOT_USED | O |
| 9 | VALUE_CPU_3 | FLOAT | NOT_USED | O |
| 10 | VALUE_NETWORK_1 | FLOAT | IN_BYTE | O |
| 11 | VALUE_NETWORK_2 | FLOAT | IN_PKT | O |
| 12 | VALUE_NETWORK_3 | FLOAT | OUT_BYTE | O |
| 13 | VALUE_NETWORK_4 | FLOAT | OUT_PKT | O |
| 14 | VALUE_RR | FLOAT | Number of requests received per second | O |
| 15 | VALUE_RT_50 | FLOAT | Request Time 50% Quantile Average growth rate | O |
| 16 | VALUE_RT_90 | FLOAT | Request Time 90% Quantile Average growth rate | O |
| 17 | VALUE_RT_99 | FLOAT | Request Time 99% Quantile Average growth rate | O |

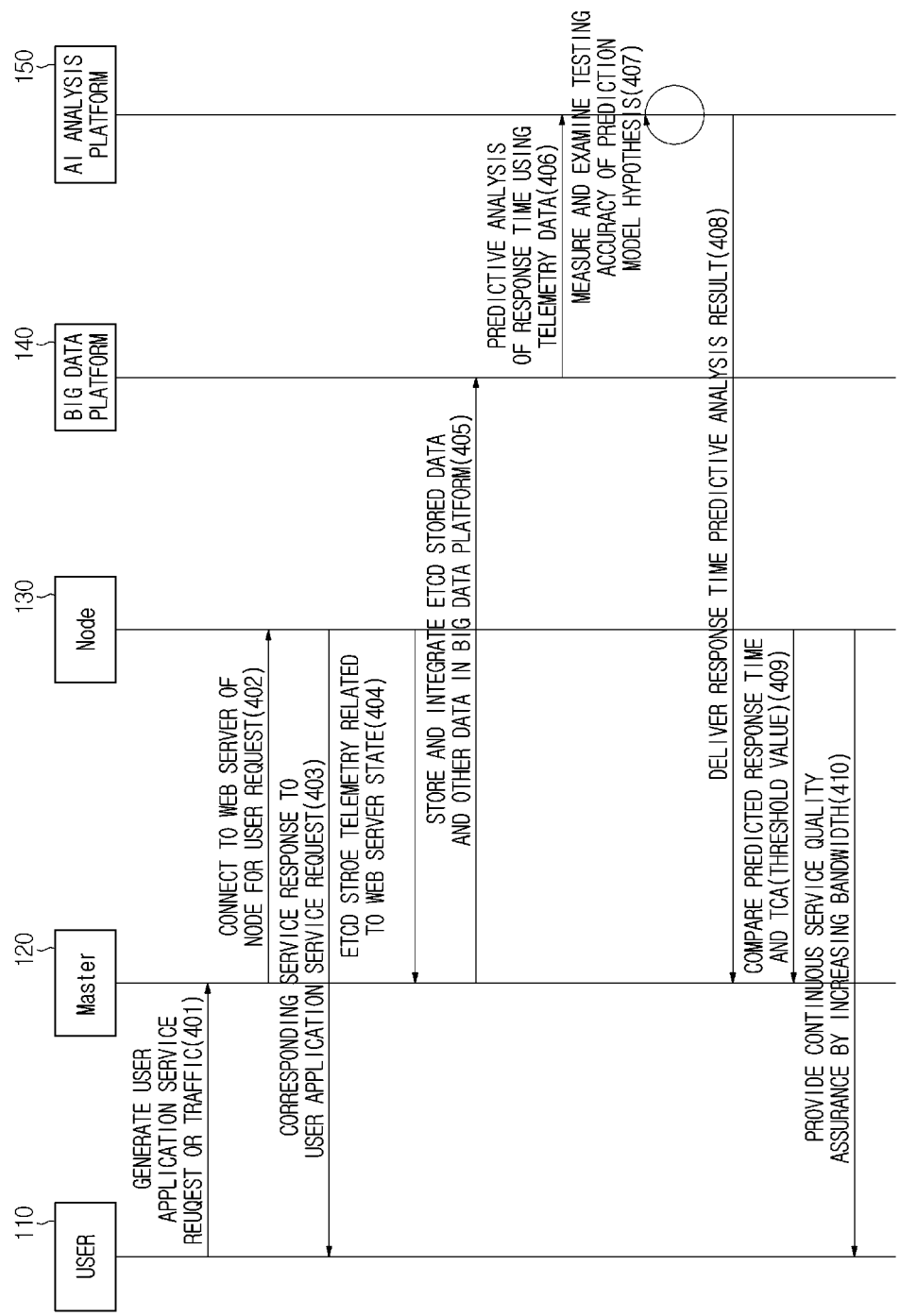

METHOD AND APPARATUS FOR PREDICTING APPLICATION SERVICE RESPONSE TIME IN COMMUNICATION SYSTEM

CROSS REFERENCE TO RELATED APPLICATION

The present application claims priority to a Korean application KR 10-2021-0098437, filed Jul. 27, 2021, the entire contents of which are incorporated herein for all purposes by this reference.

BACKGROUND OF THE INVENTION

Field of the Invention

The present disclosure relates to a method and apparatus for predicting application service response time in a communication system. Particularly, the present disclosure relates to a method, apparatus and system for predicting response time required to provide an application service to a user in response to the user's request of the application service in a server of a communication system.

Description of the Related Art

Generally, a method for predicting response time in a communication system means a technique of prediction by applying a multiple regression analysis model or a supervised learning algorithm of artificial intelligence (AI) deep learning (DL) as a statistical method. However, a technique for predicting response time in an existing communication system has the problem of inefficiency in actual application of the system since only a statistical method is simply applied.

Accordingly, when utilizing a technique for predicting response time in an existing communication system, a problem occurs that service quality assurance cannot be continuously provided. Furthermore, when utilizing a technique for predicting response time in an existing communication system, service interruption often occurs due to a breakdown of ICT infrastructure.

SUMMARY

An object of the present disclosure is to provide a method and apparatus for performing efficient response time prediction by using data, which are applied to providing a current application service, and a request time prediction value for a user's new application service request.

Also, an object of the present disclosure is to provide a method and apparatus for ensuring continuously application service quality assurance of a communication system through efficient response time prediction.

Also, an object of the present disclosure is to provide an efficient big data collection method and apparatus that are implemented by a data collection and storage device in the response time prediction method and apparatus.

Also, an object of the present disclosure is to provide a big data analysis method and apparatus, which perform prediction by means of a statistical prediction model and an AI deep learning algorithm, for data that are collected and stored by the data collection and storage device.

Also, an object of the present disclosure is to provide a method and apparatus for performing continuously quality assurance of an application service by using an augmented analysis, which generates automatically natural languages in an analysis report using an optimal prediction model, and a hyper-automation technique that automatically determines whether to increase or decrease a network bandwidth based on a prediction result of user request time in operator UI orchestration.

Other objects and advantages of the present disclosure will become apparent from the description below and will be clearly understood through embodiments of the present disclosure. Also, it will be easily understood that the objects and advantages of the present disclosure may be realized by means of the appended claims and a combination thereof.

A method for predicting application service response time in a communication system according to an embodiment of the present disclosure for achieving the above object includes: data collection for collecting network data associated with a user application service, in response to a request for the application service by a user device; and data analysis for performing, by utilizing the collected data, a response time predictive analysis, in order to predict a user's application service response time. The data analysis selects an optimal prediction model by initially applying a response time prediction model and testing the initial prediction model that is applied.

Also, the data analysis applies a multiple regression analysis (MRA) model for analyzing.

Also, the collected data may include 9 variable values for response time $Y_i$, number of requests received per second $X_1$, CPU usage averaged across cores $X_2$, number of interrupts generated per second $X_3$, number of context switches per second $X_4$, KB of data received per second $X_5$, number of packets received per second $X_6$, KB of data sent per second $X_7$, and number of packets sent per second $X_8$.

Also, a predictive analysis report is generated by performing graph and natural language generation (NLG) on a predictive analysis result for response time based on the multiple regression analysis model.

Also, augmented analytics by natural language generation is performed on the predictive analysis report.

Also, hyper automation may be further included in which the predictive analysis report is utilized and a network bandwidth is automatically increased or decreased by comparing a value of the response time prediction and a threshold that is predefined for each user.

Also, the data analysis may be configured to include a first step of selecting a response time prediction model, a second step of estimating a parameter of the prediction model, a third step of testing the goodness of fit of the prediction model, a fourth step of testing a hypothesis of an applied model when the goodness of fit of the prediction model is tested, a fifth step of measuring final goodness of fit when both the third step and the fourth step determine that goodness of fit is satisfied.

Also, the data analysis may be configured to include a sixth step of selecting another prediction model, when goodness of fit is not satisfied in any one of the third step, the fourth step and the fifth step.

Also, the sixth step selects the another prediction model by varying a variable of the prediction model that is selected in the first step.

Also, the first step or the sixth step may utilize any one among stepwise variable selection, forward selection and backward elimination as a variables selection method for selecting an optimal model.

Also, the first step or the sixth step may select an optimal prediction model by using a reference statistic value.

Also, the data analysis performs, for the collected data, one or more among log analysis, packet inspection, packet flow monitoring, and telemetry and root analysis and predicts response time based on an operation of a network, which is related to at least one of payload, protocol, bandwidth and link connection.

Also, the data analysis may perform a variables selection analysis when a multicollinearity problem occurs among prior 8 explanatory variables in the multiple regression analysis model.

Also, the data analysis may include detecting whether the collected data has one or more anomalies among point anomaly, collective anomaly and contextual anomaly.

Also, postprocessing may further be included which compares the predicted response time and a predefined threshold and manages the predicted response time to be included within the set threshold.

An apparatus for predicting application service response time in a communication system according to an embodiment of the present disclosure for achieving the above object includes: a data collection means of collecting and storing network data related to a user application service, in response to a request of the application service by a user device; and a data analysis means of performing a response time predictive analysis, in order to predict a user's application service response time, by using the collected data. The data analyze means applies initially a response time prediction model and selects an optimal prediction model by testing the applied initial prediction model.

A system for predicting application service response time in a communication system according to an embodiment of the present disclosure for achieving the above object includes: a user device that requests a user application service; a big-data collection platform that collects and stores network data related to the user application service in response to a user application service request of the user device; a big-data analysis platform that performs a response time predictive analysis by utilizing the collected data in order to predict a user's application service response time (herein, the big-data analysis platform applies initially a response time prediction model and selects an optimal prediction model by testing the initial prediction model that is applied); and a master device that compares the predicted response time and a predefined threshold and manages the predicted response time to be included within the set threshold.

According to embodiments of the present disclosure, since a situation likely to degrade service quality is predicted beforehand by response time prediction and a resource is increased and provided so that service quality is provided continuously, service quality assurance may be continuously provided by the response time predictive analysis.

In addition, according to embodiments of the present disclosure, since a given resource of ICT infrastructure is managed more efficiently and thus service quality is continuously guaranteed and ICT infrastructure is also managed more efficiently due to service quality assurance, service interruption caused by infrastructure failure may be prevented.

BRIEF DESCRIPTION OF THE DRAWINGS

FIG. 2 is a view illustrating an example of collecting and storing data necessary for predicting response time according to an embodiment of the present disclosure.

FIG. 3 is a view illustrating a telemetry data structure as an example of data necessary for predicting response time according to an embodiment of the present disclosure.

FIG. 4 is a view illustrating an exemplary operation of performing a response time predictive analysis of each system element according to an embodiment of the present disclosure.

DETAILED DESCRIPTION

Figure 1:
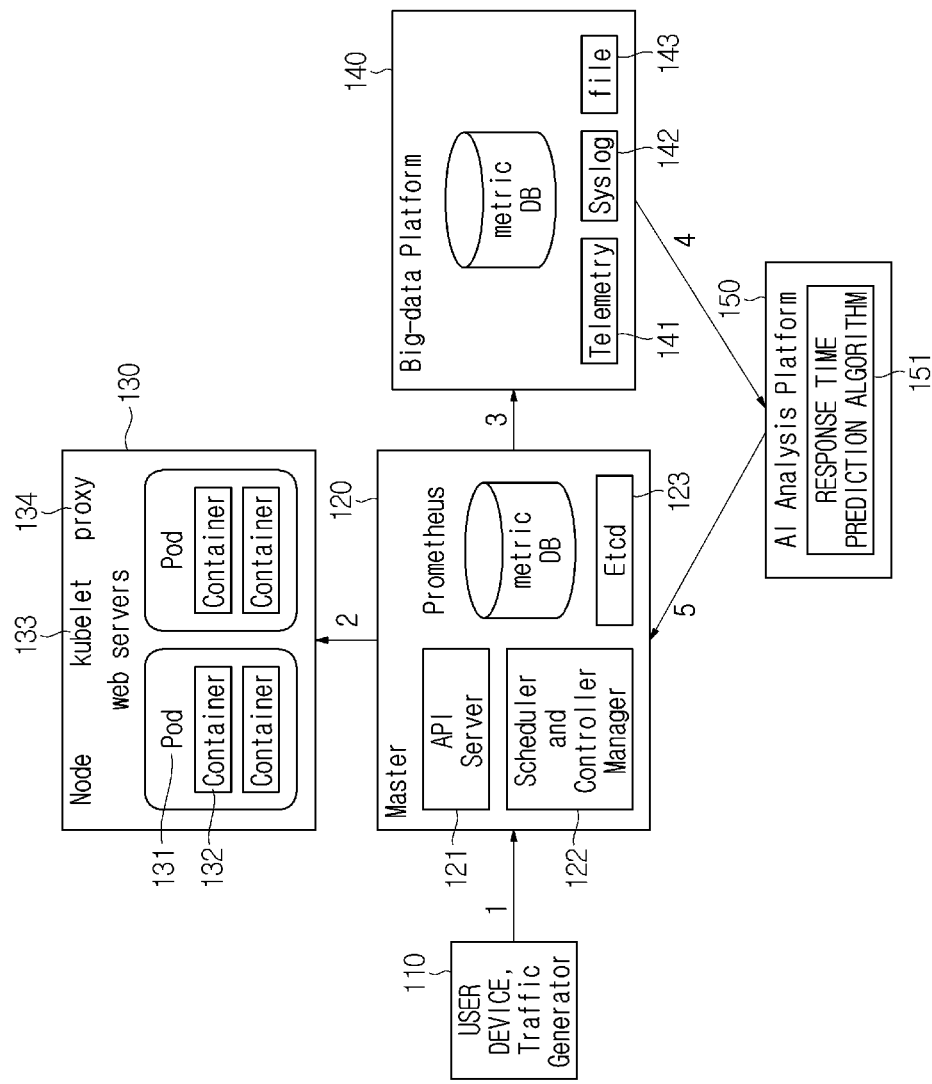
FIG. 1 is a view showing an architecture of a response time prediction apparatus and system to which the present disclosure is applicable.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

A variety of modifications may be made to the present disclosure and there are various embodiments of the present disclosure, examples of which will now be provided with reference to drawings and described in further detail. However, the present disclosure is not limited thereto, although the exemplary embodiments can be construed as including all modifications, equivalents, or substitutes in a technical concept and a technical scope of the present disclosure. In describing each view, a similar reference sign is used for a similar component.

For example, the present disclosure provides quality assurance in providing an application service by actively dealing with and preventing a complaint about response time delay of the application service at a user's request of the application service. Particularly, in order to determine when to trigger based on a prediction result by applying an optimized algorithm that predicts a response time, it is tested whether or not the optimized algorithm has actually improved application service quality assurance for provide an application service. To this end, a big data collector is used which monitors conditions of ICT infrastructure devices (e.g. server, storage, network), which are used to provide an application service, collects big data, which are created on a preset cycle, through telemetry and log files and stores the big data in a database.

"Performance", which is a term used in the present disclosure, means generally network throughput (e.g. TCP/UDP), latency, jitter, connectivity, error rate and the like.

In addition, assuring service quality and improving performance by response time prediction for a request of an application service includes increasing throughput for a communication system, reducing an error rate and a response time and improving latency. In addition, monitoring of a condition of each device generally refers to determining and/or calculating one or more among the performance parameters related to a communication link. In addition, among terms used in the present disclosure, "TCP" means a transmission control protocol, and "UDP" means a user datagram protocol.

In this regard, in the present disclosure, the performance of a communication system may be evaluated using a testing software application such as iperf, netperf, and ttcp. The testing software applications may be installed in at least 2 communication devices so that a software application of one communication device generates and transmits test data to another communication device and a software application of the another communication device receives the test data.

Generally, techniques are known which are limited to a method and system for collecting data in an apparatus for data collection through monitoring for application service quality for a user service request and for measuring quality. On the other hand, as there is no known technique for a method of predicting a response time for a user service request, it is problematic that there is no one technique for ensuring the quality of an application service.

For example, a user may request a performance testing application service site, and then a testing software application may be loaded on the web browser of a user terminal (e.g. notebook, PC, laptop and the like).

As packets transmitted and received between a user terminal (e.g. PC, notebook, laptop) and an Internet server are delivered, the following data are applied to predict a user response time.

Response time (RT)
Number of requests received per second (RR)
CPU usage averaged across cores (CPU)
Number of interrupts generated per second (Inter)
Number of context switches per second (CTXSW)
KB of data received per second (KBIn)
Number of packets received per second (PktIn)
KB of data sent per second (KBOut)
Number of packets sent per second (PktOut)

The data are generated and measured by using a testing software application, and a storage device collects and stores the big data in a database or log files in real time.

Hereinafter, embodiments of the present disclosure will be described with reference to the accompanying drawings.

FIG. 1 is a view showing an architecture of a response time prediction apparatus and system to which the present disclosure is applicable. Referring to FIG. 1, an apparatus configuration applicable to the present disclosure will be described below.

In this regard, Kubernetes will be described first in order to understand the apparatus configuration of the present disclosure. Kubernetes is an open source program for automating management in operating a virtualized server of Linux containers. Herein, Kubernetes is an orchestration software tool that supplies functions to automate automatic start, container deployment, extension and control management for each container of a virtualized server. In this regard, basic terms of Kubernetes used in this present disclosure may be explained as follows.

1. Master 120: means a management server that performs integrated control management of all the nodes for each node (server).

2. Node 130: means a computing server as physical hardware. Virtual separation of one corresponding server is pod 131. Accordingly, one physical hardware node may be virtually distinguished into two or more pods. Each node is a physical server or a virtual machine, to which a container separated by virtualization is to be deployed, and is also called worder node. The node includes modules of kubelet, proxy and pod.

3. Pod 131: is one or more container groups that are virtualized and deployed to a single node (server). Several containers may be managed together in pod units.

4. Container 132: means a virtualized entity as a further division of a pod that is separated from a single server node through virtualization. Accordingly, virtualized separation may be applied to two or more containers in a pod that is separated by virtualization.

Referring to FIG. 1, a response time predictive analyzer according to FIG. 1 includes master 120, node 130, a big data platform 140 and an AI analysis platform 150. In addition, in FIG. 1, a user device 110 means an external device that generates actual data and/or requests data. However, the terms used above are selected for the convenience of describing the present disclosure, and any function, which is the same as described in the present disclosure, will be clearly included in the scope of the present disclosure, irrespective of terms.

The master 120 has a master function of performing control for an operation of virtualized Kubernetes and performs functions of collecting and storing traffic by using an API server, a scheduler and a controller manager, which manage nodes, and etcd function. Herein, the API server 121 is a place of providing every function of Kubernetes to REST API and of processing a relevant command and performs functions not only of requesting kubet 1 to a component, which all the components in a container use to call each other, but also of log checking and debugger for a container in operation such as request processing of internal module, authority approval and refusal of request. In addition, the scheduler 122 performs a function of allocating each resource like pod and service to every node, adds and deletes nodes and executes load balancing. In addition, the controller manager 122 performs management by a controller like the application of Kubernetes and a function of allocating to a suitable node so as to execute copy and distribution commands of pod to each controller. In addition, etcd 123, which is a server functioning as a database of Kubernetes cluster, may restore a cluster, divide it into a multiple number, copy and simply store a value, read, check a change of state through a watching function, and communicate with the API server 121. Other modules may access etcd data via the API server.

The node 130 includes kubelet 133, proxy 134 and pod 131. Herein, the kubelet 133, which is an agent distributed to the node, communicates with the API server 121 of the master 120 and operates a work node by receiving a command to be executed from the API server 121 of the master 120. In addition, the proxy 134 has a function of managing a network, which is connected to the pod 131 allocated to a node, and implements a process of operating the network by routing traffic from a node to a corresponding container and managing network communication between the node and a master. In addition, the proxy 134 forwards TCP, UDP and SCTP streams, routs traffic, which enters a node that provides a service by binding a plurality of pods, to a container, performs load balancing, manages registration to iptables for communication management by proxy, and recently supports a function of IPVS.

The big data platform 140 is an assembly of techniques for integrating real-time telemetry data 141, various syslog 142 and data file 143 into an enormous volume of big data and is also a platform environment that is ready to manage and use data well. In this regard, the big data platform 140 is a term selected for convenience of describing the present disclosure and may be replaced by another general term. For example, 'data collection means', 'big data collection platform', 'big data collector' and the like may be alternatives.

In addition, the big data platform 140 may be applied by using Data Warehouse, Hadoop and Kafka platforms capable of collecting, storing, processing and storing bid data. In addition, a function of integrating various and different types of databases and a function of visualizing graphic representations of necessary data before analysis are also performed.

The AI analysis platform 150 is a system loaded with a data mining algorithm or a response time prediction algorithm 151, which is capable of analyzing big data by means of an AI algorithm or an analysis platform, and performs an analysis function for response time prediction of the present disclosure. In this regard, the AI analysis platform 150 is a term selected for convenience of describing the present disclosure and may be replaced by another general term. For example, 'data analysis means', 'big data analysis platform', 'big data analyzer' and 'analysis platform' may be alternatives.

In addition, the AI analysis platform 150 is an analysis platform loaded with various algorithms for analysis, including exploratory data analysis (EDA), regression analysis, multivariate analysis, data mining, supervised learning, non-supervised learning, semi-supervised learning, reinforcement learning and federated learning, and provides a function of finding an optimal model more efficiently by providing various test statistics for response time prediction.

In addition, the user device 110 may be a device, by which a user demands an application service, or a traffic generator that generates traffic. Herein, the user device 110 may use a testing software application such as iperf, netperf, and ttcp. In this regard, the testing software applications may be installed and implemented in at least 2 communication devices so that a software application of one communication device generates and transmits test data to a communication device of another application service server and a software application of the communication device of the another application service server receives the test data.

FIG. 2 is a view illustrating an example of collecting and storing data necessary for predicting response time according to an embodiment of the present disclosure. Particularly, in FIG. 2, in a Kubernetes master according to an embodiment of the present disclosure, Prometheus collects, among telemetry data, statistical data such as node, pod, container, response time, CPU usage, bytes received via network, packets received via network, bytes sent via network, packets sent via network, and number of requests per second in a data profile program, which is necessary to predict response time, and stores the statistical data in the etcd 123.

FIG. 3 is a view illustrating a telemetry data structure as an example of data necessary for predicting response time according to an embodiment of the present disclosure. Particularly, FIG. 3 is a view that illustrates a structure of telemetry data necessary for predicting response time, which are stored by istio in Prometheus, and describes names of variables, a type of data (e.g. typical variable, atypical variable, integer and prime number) and a data variable.

FIG. 4 is a view illustrating an exemplary operation of performing a response time predictive analysis of each system element according to an embodiment of the present disclosure. Particularly, FIG. 4 shows operations of the user device 110 and each component 120, 130, 140 and 150 of the response time predictive analyzer of FIG. 1 according to an embodiment of the present disclosure.

Specifically, a service request starts from the user device or traffic generator 110, the node 130 of a corresponding service is connected through management of the Kubernetes master 120 so that the service is performed. Statistical information associated with the situation is stored in etcd 123 of the master 120, and only data necessary to predict response time of an embodiment are extracted in a device integrated into the big data platform 140. Next, the data are analyzed in the AI analysis platform 150 and are compared with test statistics of a corresponding model. Thus, FIG. 4 is a schematic diagram showing a procedure of searching for an optimal model for predictive analysis.

Figure 5:
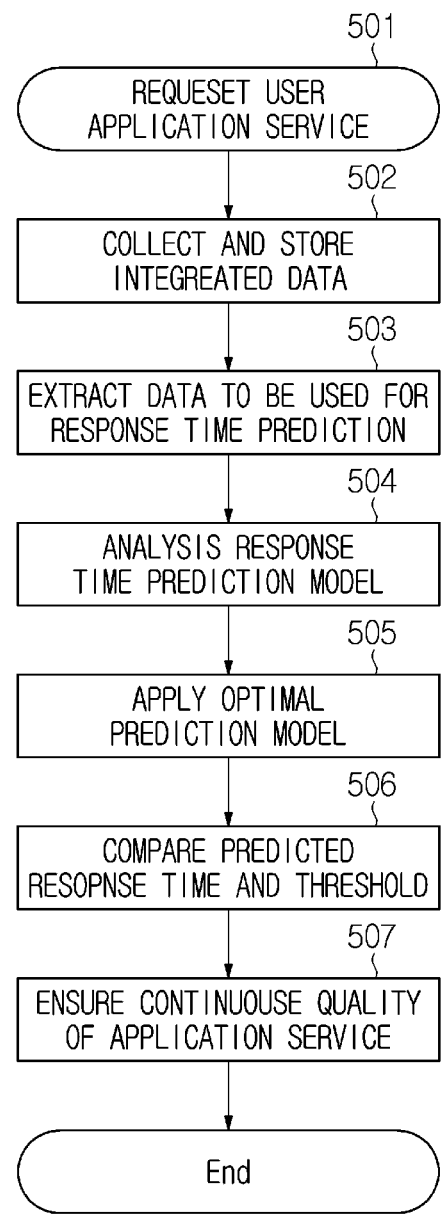
FIG. 5 is a flowchart illustrating a method of predicting a response time according to an embodiment of the present disclosure.
Figure 6:
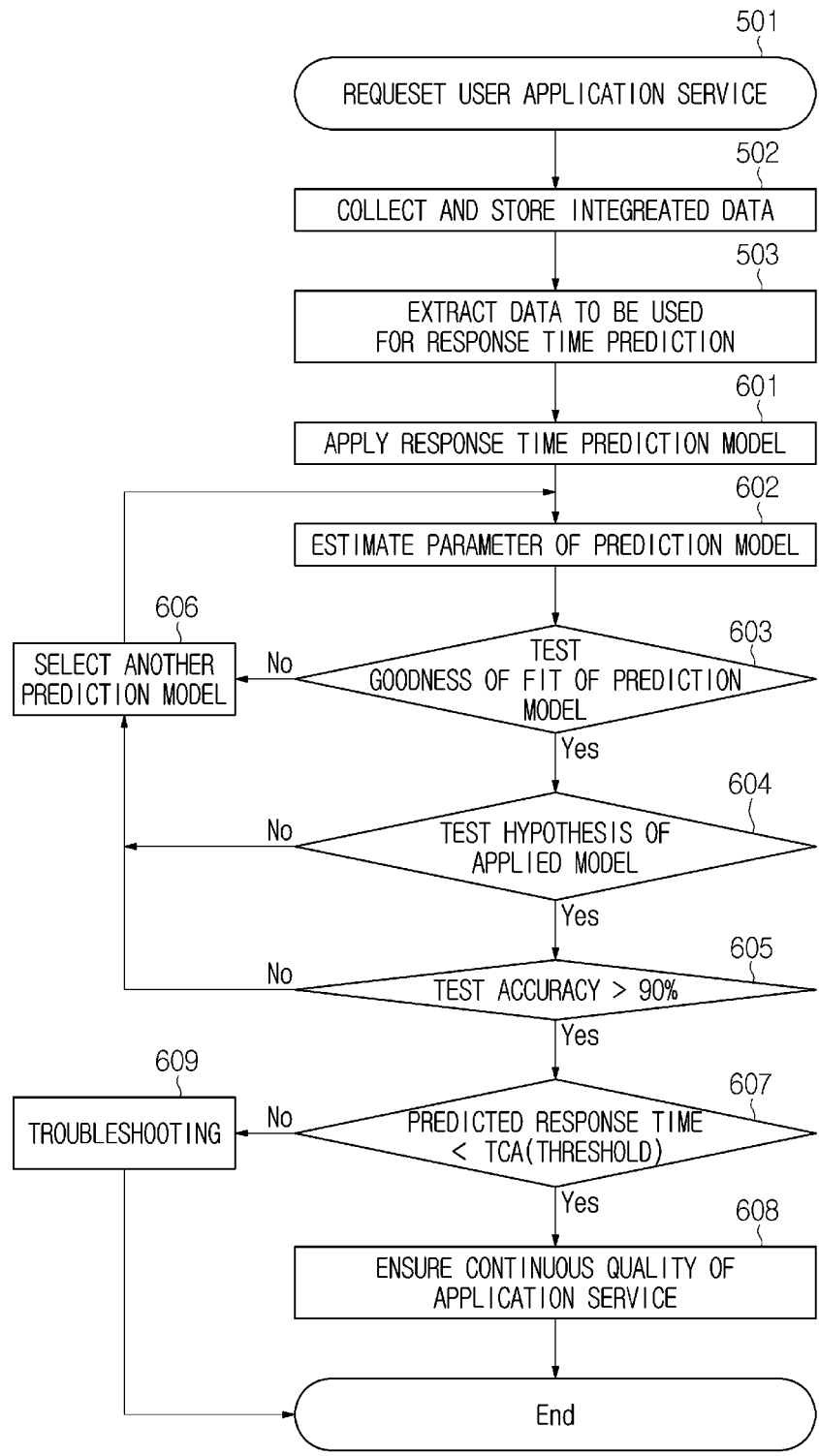
FIG. 6 is a view illustrating a concrete order of a process of searching for an optimal model in an overall procedure of performing a response time predictive analysis according to an embodiment of the present disclosure.

In addition, FIG. 5 is a flowchart illustrating a method of predicting a response time according to an embodiment of the present disclosure, and FIG. 6 illustrates a detailed order of searching for an optimal model in an overall procedure of response time predictive analysis according to an embodiment of the present disclosure.

Hereinafter, referring to FIGS. 4 to 6, a method for predicting response time according to an embodiment of the present disclosure will be described in detail.

First, the user device 110 generates a user application service request or traffic (401, 501). The master 120 may be connected to a web server of the node 130 of the service (402). Next, the node 130 provides a corresponding service response to the user application service request 401 (403). Herein, telemetry related to the web server state of the node 130 for the user request is stored in etcd (404). For example, statistical information associated with a state caused by performing the service in connection with the node 130 of the service is stored in the etcd 123 of the master 120.

The big data platform 140 integrates and stores the data, which are stored in the etcd 123, and other data (405, 502). Next, the AI analysis platform 150 extracts only data necessary to predict response time of an embodiment in a device integrated into the big data platform 140 and analyzes a response time prediction model (406, 504). For example, telemetry data may be used as data necessary to predict response time. Herein, the AI analysis platform 150 performs a procedure of searching for an optimal model of predictive analysis by comparing test statistics of a corresponding model (407, 505). Next, when receiving a result of the response time predictive analysis (408), the master 120 compares the predicted response time with a threshold (TCA) (409, 506), and in case the predicted response time is lower than the threshold (TCA), the master 120 provides continuous service quality assurance by increasing a bandwidth (410, 507).

In this regard, the analyzing of the prediction model and the searching for of an optimal model according to an analysis result (406-407, 504-505) will be described in detail with reference to FIG. 6.

FIG. 6 illustrates an overall procedure of a response time predictive analysis according to an embodiment of the present disclosure. Particularly, the steps S601 to S606 illustrate the above-described process (406 to 407, 504 to 505) of the AI analysis platform 150 for analyzing a prediction model and applying an optimal model in detail.

First, a response time prediction model is selected and applied (601). Next, a parameter of the prediction model is estimated (602) and then the goodness of fit of the prediction model is tested (603). When the goodness of fit of the prediction model is tested, a hypothesis of an applied model is tested (604). In case both the step S603 and the step S604 determine that the models have goodness of fit, final goodness of fit is measured (605). For example, the final goodness of fit may be measured based on whether or not an accuracy measurement exceeds a preset value (e.g. 90%). On the other hand, in case goodness of fit is not satisfied in any one step of the steps S603, S604 and S605, another prediction model is selected (606). For example, according to the present disclosure, the another prediction model may be selected by varying a variable of the response time prediction model that is selected in the step S601.

In addition, FIG. 6 illustrates an overall procedure of a response time predictive analysis according to an embodiment of the present disclosure. Particularly, the steps S607 to S609 illustrate a post processing process (409 to 410, 506 to 507) of predicted response time, which is implemented by the master 120, in detail. For example, in the step S605, when the final goodness of fit is satisfied, the master 120 compares a predicted response time and a threshold (TCA) (607), and in case the predicted response time is lower than the threshold (TCA), provides continuous service quality assurance by increasing a bandwidth (608). On the other hand, in case the predicted response time is higher than the threshold (TCA), the master 120 performs troubleshooting (609) and ends the process.

Hereinafter, according to an embodiment of the present disclosure, a predictive analysis will be described in detail which uses a multiple regression analysis (MRA) as a method of response time predictive analysis at an application service request of a user device.

According to the present disclosure, the multiple regression analysis is a model of obtaining a multiple regression equation by using quantitative continuous variables for both dependent variable (response variable) $Y_i$ and independent variable (explanatory variable) $X_1, X_2, \ldots, X_n$. Herein, a multiple regression analysis (multiple regression model) is a case in which the explanatory variable $X_i$ consists of two or more explanatory variables. Multiple regression analysis is a model that is applicable to a case in which there is a strong correlation between a dependent variable and an explanatory variable. Accordingly, a predictive analysis model may be differently applied by adjusting various variables, and the application of a change of predictive model through such adjustment of variables has an advantage of efficiency.

For example, in an embodiment of the present disclosure, an estimation equation for predicting a response time may be obtained and applied to prediction by using a method of obtaining an estimation equation among the following variables: response time $Y_i$, number of requests received per second $X_1$, CPU usage averaged across cores $X_2$, number of interrupts generated per second $X_3$, number of context switches per second $X_4$, KB of data received per second $X_8$, number of packets received per second $X_6$, KB of data sent per second $X_7$, and number of packets sent per second $X_8$.

An equation of a multiple regression analysis model for an embodiment of the present disclosure may be expressed by Formula 1 below.

$$Y_i = \beta_0 + \beta_1 X_1 + \beta_2 X_2 + \beta_3 X_3 + \beta_4 X_4 + \beta_5 X_5 + \beta_6 X_6 + \beta_7 X_7 + \beta_8 X_8 + \varepsilon_i \quad \text{[Formula 1]}$$

In the model equation of multiple regression analysis, the assumption of independence, homoscedasticity and normality may be applied to the error term $\varepsilon_i$, and the error term may have the same variance $\sigma^2$ for every explanatory variable value $X_i$.

Here, the error term has a mean value of 0, and the probability distribution of collected data follows a normal distribution. That is, it is assumed that the variance of $Y_i$ is $\sigma^2$ and the error term $\varepsilon_i$ follows the normal distribution of $N(0, \sigma^2)$. Also, it is assumed that n observed (measured) values for $Y_i$ are the samples $\{y_1, y_2, \ldots, y_n\}$ and $X_i$ values for each $Y_i$ value are given as $\{x_1, x_2, \ldots, x_n\}$.

In the equation of a multiple regression analysis model, $\beta_0, \beta_1, \ldots, \beta_k$ are regression coefficients and parameters. $\beta_i$ is the partial differential coefficient of i-th explanatory variable and means an impact when the values of the other explanatory values are fixed. In this regard, the explanatory variables $x_{1i}, x_{2i}, \ldots, x_{ki}$ are deterministic but not random variables, and the distribution of a dependent variable is the same as the distribution of the error term. Herein, at least one or more variables are measurable (quantitative) variables. For normality testing of the error term, a Shapiro Wilk W-statistic, a Kolmogorov-Smirnov D-statistic, an Anderson-Daring AD statistic and a Cramer-von Mises W-sq statistic and a P-value are obtained. In addition, when P-value is less than the level of significance $\alpha=0.05$, it may be determined that normality is followed. This may be graphically confirmed by Q-Q plot or histogram.

Meanwhile, when normality is violated, it may be solved by normal transformation that may be defined by Table 1 below. That is, an optimal model is searched by power transformation defined in Formula 2.

$$Y^* = \begin{bmatrix} Y^3, \text{ left} \\ Y^2, \text{ mild left} \\ \sqrt{Y}, \text{ mild right} \\ \ln(Y), \text{ right} \\ 1/Y, \text{ serve right} \end{bmatrix} \quad \text{[Formula 2]}$$

Additionally, when the relation between a dependent variable and an explanatory variable is checked with respect to linearity and there is no linearity, a prediction may be made by performing transformation according to Table 1 below and then applying a model of a nonlinear regression equation.

TABLE 1

| Method | Transformation | Regression Equation | Multiple regression |
|---|---|---|---|
| Exponential Model | log(y) | $\log(y) = \beta_0 + \beta_1 x_{i1} + \beta_2 \exp(x_{i2}) + \exp(x) \ldots + \beta_k \exp(x_{ik})$ | |
| Reciprocal Model | 1/y | $1/y = \beta_0 + \beta_1 x_{i1} + \beta_2 x_{i2}^2 + \ldots + x^2 \beta_k x_{ik}^k$ | |

TABLE 1-continued

| Method | Trans-formation | Regression Equation | Multiple regression |
|---|---|---|---|
| Logarithmic Model | $\log(x_i)$ | $y = \beta_0 + \beta_1\log(x_{i1}) + \beta_2\log(x_{i2}) + \log(x_i)$ $\ldots + \beta_k\log(x_{ik})$ | |
| Power Model | $\log(y)$ $\log(x_i)$ | $\log(y) = \beta_0 + \beta_1\log(x_{i1}) +$ $\beta_2\log(-x_{i2}^2) + \ldots + \beta_k\log(-x_{ik}^2)$ | $-x^2$ |

As for a method for diagnosing linearity in this embodiment, linearity may be determined by examining an individual scatter plot between a dependent variable and an explanatory variable or a scatter plot based on residuals. As for an ordinary least squares (OLS) estimate, an estimate may be calculated which minimizes $$\min_{\beta_0,\beta_1,\ldots,\beta_k} \sum_{i=1}^{n} \varepsilon_i^2$$

by the sum of squares of error terms.

In addition, for a multiple regression equation which estimates the parameters $\beta_0, \beta_1, \beta_2, \beta_3, \beta_4, \beta_5, \beta_6, \beta_7, \beta_8$ for Formula 1, each t-test method will be described as an individual test for the validity of each estimated parameter value.

T-test for individual regression models is a method of completing an equation of a complete regression model by removing unnecessary explanatory variables after applying all the multiple regression models and performing an individual t-test for each estimated parameter.

T-test may test a hypothesis for individual parameters (regression coefficients) for a slope and an intercept respectively.

① Hypothesis:

$H_0: \beta_i = 0$ $H_1: \beta_i \neq 0$

② Test statistics:

$$T_i = \frac{\hat{\beta}_i}{se(\hat{\beta}_i)}, \quad \sim t(\alpha/2; n-k-1)$$

③ The confidence interval $E[y|x] = \beta_0 + \beta_1 X_{11} + \beta_2 X_{12} + \ldots \beta_k X_{1K}$ is estimated to be $\hat{y}_1 = \hat{\beta}_0 + \hat{\beta}_1 x_{11} + \hat{\beta}_2 X_{12} \pm \hat{\beta}_k x_{1k}$, the confidence interval of $100(1-\alpha)\%$ is $$\hat{y}_i = t_{1-\frac{\alpha}{2}}(n-k-1)\hat{\delta}\left\{\sum_{i=0}^{k}\sum_{j=0}^{k}c_{ij}X_iX_j\right\}^{\frac{1}{2}}.$$

Accordingly, a future observed value of y has the following confidence interval of $100(1-\alpha)\%$.
The confidence interval of y is obtained by $$\hat{y}_i \pm t_{1-\frac{\alpha}{2}}(n-k-1)\hat{\delta}\left\{1 + \sum_{i=0}^{k}\sum_{j=0}^{k}c_{ij}X_iX_j\right\}^{\frac{1}{2}}$$

Meanwhile, individual regression coefficients in a multiple regression analysis may be inferred as in Table 2 below.

TABLE 2

| Explanatory variable | Regression coefficient | Standard error | t-value | P-value |
|---|---|---|---|---|
| $X_1$ | $\hat{\beta}_0$ $\hat{\beta}_1$ | $se(\hat{\beta}_0)$ $se(\hat{\beta}_1)$ | $T_0 = \hat{\beta}_0/se(\hat{\beta}_0)$ $T_1 = \hat{\beta}_1/se(\hat{\beta}_1)$ | $P\{|T_{n-k-1}| > |T_0|\}$ $P\{|T_{n-k-1}| > |T_1|\}$ |
| . . . | . . . | . . . | . . . | . . . |
| $X_k$ | $\hat{\beta}_k$ | $se(\hat{\beta}_k)$ | $T_k = \hat{\beta}_k/se(\hat{\beta}_k)$ | $P\{|T_{n-k-1}| > |T_k|\}$ |

As a result of t-test for an individual regression model of a multiple regression model, p-value, which is obtained by t-statistics, and the level of significance $\alpha=0.05$ is compared, and when P-value<$\alpha=0.05$, the null hypothesis (H0) may be rejected, the alternative hypothesis (H1) and thus its significance may be accepted, and an individual regression coefficient may be determined to be significant.

For all the multiple regression models, the goodness of fit is determined by performing F-test, which may be described as follows.

① Hypothesis:
Null hypothesis $H_0: \beta_0=\beta_1=\beta_2=\ldots=\beta_7=\beta_8=0$, every explanatory variable is not significant.
Alternative hypothesis $H_1: \beta_0 \neq \beta_1 \neq \beta_2 \neq \neq \ldots = \beta_7 \neq \beta_8 \neq 0$, there is at least one explanatory variable that is significant.

② F-test statistics for testing the goodness of fit of all the parameters $\beta_0, \beta_1, \beta_2, \ldots, \beta_7, \beta_8$ may be obtained by the following equation.

$$F = \frac{MSR}{MSE} = \frac{\frac{SSR}{k}}{\frac{SSE}{n-k-1}} \sim F(k, n-k-1)$$

p-value is obtained.

④ The test is performed by comparing the level of significance $\alpha=0.05$ and a p-value thus obtained.
A multiple regression model is tested by means of F-statistics based on an analysis of variance (ANOVA) table that is shown in Table 3 below.

TABLE 3

| Factor of distribution | Sum of squares | Degree of freedom | Mean square | F value |
|---|---|---|---|---|
| Regression | SSR | k | MSR = SSR/k | F = MSR/MSE $\sim F(k, n-k-1)$ |

TABLE 3-continued

| Factor of distribution | Sum of squares | Degree of freedom | Mean square | F value |
|---|---|---|---|---|
| Residual | SSE | n − k − 1 | MSE = SSE/n − k − 1 | |
| Sum | SST | n − 1 | | Coefficient of determination: $R^2 = \frac{SSR}{SST}$ |

In Table 3, the residual sum of squares (SSE) is $\Sigma_{i=1}^{n}(y_i-\hat{y}_i)^2$, the regression sum of squares (SSR) is $\Sigma_{i=1}^{n}(\hat{y}_i-\overline{y})^2$, the total sum of square is $\Sigma_{i=1}^{n}(y_i-\overline{y})^2$), and $$F = \frac{MSR}{MSE} = \frac{\frac{SSR}{k}}{\frac{SSE}{n-k-1}} \sim F(k, n-k-1).$$

In the equation above, the P-value, which is obtained based on F-test statistics, may be determined in comparison with the level of significance α=0.05.

The explanation power of a multiple regression model may be explained by means of a coefficient of determination and an adjusted coefficient of determination. Here, the explanation power of a multiple regression equation may be represented by the coefficient of determination $$R^2 = \frac{SSR}{SST}$$

and the adjusted $R^2$ $$R_{adju}^2 \frac{\frac{SSE}{n-k-1}}{\frac{SST}{n-1}} = 1 - \left(\frac{n-1}{n-k-1}\right)(1-R^2).$$

As a result of F-test for all the multiple regression models, p-value, which is obtained by F-statistics, and the level of significance α=0.05 is compared, and when P-value<α=0.05, the null hypothesis is rejected and the alternative hypothesis is accepted and is determined to have significance.

A multiple regression model obtained herein is determined to have a straight linear relation, a linear equation thus obtained applies parameter values of $\hat{\beta}_0, \hat{\beta}_1, \ldots, \hat{\beta}_k$, which are estimated by the multiple regression equation $\hat{y}_i = \hat{\beta}_0 + \hat{\beta}_1 X_{i1} + \hat{\beta}_2 X_{i2} + \ldots, \hat{\beta}_k X_{ik}$, and when a new explanatory variable (Xi) is put into a regression equation thus obtained, a predicted value of response time (dependent variable Yi) may be obtained.

Based on the coefficient of determination $R^2$, the adjusted coefficient of determination $R_{adj}^2$ and a value of MSE, the predictive explanation power of an estimated multiple regression equation may be determined.

In an embodiment of the present disclosure, a prediction of response time Y may be made using a multiple regression equation that is obtained as a linear equation among the following variables: response time $Y_i$, number of requests received per second $X_1$, CPU usage averaged across cores $X_2$, number of interrupts generated per second $X_3$, number of context switches per second $X_4$, KB of data received per second $X_5$, number of packets received per second $X_6$, KB of data sent per second $X_7$, and number of packets sent per second $X_8$.

In case a linear equation based on a multiple regression analysis model is obtained by applying all the eight explanatory variables above, the problem of multicollinearity among the explanatory variables $X_i$ is very likely to occur. Multicollinearity is a problem of strong correlation among explanatory variables. Accordingly, perfect collinearity of exact correlation among explanatory variables is often distinguished from multicollinearity of high correlation among explanatory variables. As multicollinearity violates a multiple regression analysis, an optimal regression analysis model should be searched to solve the problem of multicollinearity.

A method of checking whether or not the problem of multicollinearity occurs among explanatory variables in a multiple regression analysis model is implemented using the following statistic values.

① In case of violation in T-test of individual parameters $\beta_0, \beta_1, \beta_2, \ldots, \beta_7, \beta_8$, an individual parameter value becomes 0 and thus it is determined that the problem of multicollinearity will occur.

② In case a correlation coefficient among explanatory variables $X_1, \ldots, X_8$ has a value as high as equal to or greater than σ=0.8, there is a correlation (linearity) among explanatory variables so that it is determined that multicollinearity will exist.

③ In case a variance inflation factor (VIF) has a value of 10 or greater, the existence of multicollinearity is determined, and the equation of the variance inflation factor may be represented as follows.

$$VIF_k = \frac{1}{Tol} = \frac{1}{(1-R_k^2)} \qquad \text{[Formula 3]}$$

④ In case a tolerance (TOL) has a value of 0.1 or below, the existence of multicollinearity is determined, and the equation of tolerance may be represented as follows.

$$Tol=1-R_k^2 \qquad \text{[Formula 4]}$$

⑤ In case a condition index (COLLIN) has a value of 10, there is a weak correlation, and in case COLLIN has a value of 100 or greater, there is multicollinearity among explanatory variables. The equation of COLLIN may be represented as follows.

$$Condition_k = \sqrt{\frac{\lambda_{max}}{\lambda_k}} \qquad \text{[Formula 5]}$$

Accordingly, when the problem of multicollinearity occurs by the five methods above, a multiple regression analysis applies principal components regression (PCR) and ridge regression model for explanatory variables in the multiple regression analysis and a variables selection method in order to solve the problem.

As the first method of solving the multicollinearity, PCR performs first a principal components analysis that implements reduction of variables among explanatory variables $X_1, \ldots, X_8$. The problem of multicollinearity may be solved by PCR that implements a multiple regression analysis again by using reduced variables as a result of a principal components analysis for explanatory variables.

As the second method of solving the problem of multicollinearity, a ridge regression model is applied. Ridge regression is a method of minimizing a mean squared error, as compared with the least square method that estimates a parameter by a multiple regression analysis. As a ridge regression estimate further minimizes variance and a posterior probability is obtained using a weighted prior probability that has a Gaussian distribution with average zero, a ridge regression estimates with a smaller variance than a least square estimate so that the problem of collinearity may be solved.

The third method, which is most widely adopted as a solution to the problem of multicollinearity, is a variables selection method. The variables selection method may apply the following three methods.

(1) Backward elimination is a method of completing a perfect regression model by applying a multiple regression model to every independent variable (explanatory variable), performing an individual t-test for an estimated parameter and then removing an unnecessary explanatory variable.

(2) Forward selection starts from zero, which includes only an initial constant term of explanatory variables, and selects a significant variable with highest explanatory power among explanatory variables. Thus, forward selection is a method of selecting a significant explanatory variable $X_k$ in testing the goodness of fit of a model (F-test). This method completes a perfect regression model by repeating the selection until there is no significant explanatory variable.

(3) Stepwise selection is a method of adding the backward method to the forward method by improving the problem of the forward method. Starting from zero explanatory variable $(X_1)$, a significant variable with highest explanatory power (SSR(X k)) among explanatory variables is selected. After a significant explanatory variable $X_k$ is selected in F-test of the goodness of fit of a model, the significance test is performed again for the significant explanatory variable. In case the explanatory variable is significant, it is selected. Otherwise, it is removed. This process is repeated until there is no variable to be added or removed. Thus, a multiple regression model is obtained by means of only optimal explanatory variables.

In order to select an optimal model among various models of multiple regression analysis by implementing a variables selection method as a solution to the problem of multicollinearity, the optimal model may be obtained by comparing the following statistic values. Formulas of statistics for selecting an optimal model may be represented as follows.

(1) Adjusted R-squared (ADJRSQ): is a coefficient showing how much explanatory variables explain a dependent variable and is a statistic value that is used to evaluate the goodness of fit of a regression line or to know the explanatory power of explanatory variables for a dependent variable. An ADJUSQ statistic value corrects such a problem even when an explanatory variable with weak explanatory power is included among dependent variables. ADJRSQ statistic values are compared, and a model with a value closest to 1 between 0 and 1 is selected among multiple regression analysis models.

$$1 - \frac{(n-i)(1-R^2)}{n-p} = 1 - \frac{SSE/(n-p-1)}{SST/(n-1)}$$ [Formula 6]

(2) Akaike's information criterion (AIC) is an estimated prediction error and a given set of quality statistic model data for it. When an assembly of models for data [1] [2], AIC estimates the quality of each model by comparing it with each of the other models. Accordingly, as AIC has a smaller value, it means a better model. AIC may have a negative value. A model with a minimum statistic value is selected.

$$n\ln\left(\frac{SSE}{n}\right) + 2p$$ [Formula 7]

(3) Sawa's Bayesian information criterion (BIC), which is a method of selecting a model, selects a model with a smallest value by comparing statistic values.

$$k\ln(n) - 2\ln(\hat{L})$$ [Formula 8]

(4) Schwar'z Bayesian criterion (SBC), which is a method of selecting a method, selects a model with a smallest value by comparing statistic values.

$$k\ln(n) - 2\ln(L)$$ [Formula 9]

(5) Mallow's CP (CP) selects a model that has an almost same value as the number of parameter estimates.

$$\frac{SSE = \Sigma_{i=1}^{n}(y_i - \hat{y}_i)^2}{\hat{\sigma}^2} + 2p - n$$ [Formula 10]

(6) $J_p$ (the final prediction error) obtains a mean square error for a parameter estimate under the assumption that explanatory variables have fixed values and a model is accurate. Stein's $J_p$ is also referred to as Akaike's final prediction error (FPE) and selects a model with a smallest value.

$$\frac{n+p}{n}MSE$$ [Formula 11]

(7) Mean square error (MSE) is a mean value of the squares of residuals and is a static value indicating a mean square difference between estimates and actual values. A model with a smallest value, which is never a negative value but close to zero, is selected.

$$\frac{SSE}{n-p} = \frac{\Sigma_{i=1}^{n}(y_i - \hat{y}_i)^2}{n-p}$$ [Formula 12]

(8) Root mean square error (RMSE) is a measure that is frequently used to handle a difference between an estimate or a value predicted by a model and a value which is observed in an actual environment. RMSE is suitable for expressing precision, and each difference value is also referred to as residual. RMSE is a static value, which represents residuals by a single measure, and selects a model with a smallest value that is never a negative value and close to zero.

$$\sqrt{MSE}$$ [Formula 13]

(9) Sp Hocking represents a Sp value and selects a model with a smallest value close to zero.

$$\frac{MSE}{n-p-1}$$ [Formula 14]

(10) Generalized estimated mean square error of the prediction (GMSEP) obtains a mean square error of a parameter estimate under the assumption that an explanatory variable and a dependent variable follow a multivariate normal distribution. GMSEP selects a model with a smallest value.

$$\frac{MSE(n+1)(n-2)}{n(n-p-1)} = \frac{1}{n}S_p(n+1)(n-2) \quad \text{[Formula 15]}$$

(11) Predicted residual error sum of squares (PRESS) is a static value that provides a summary measurement for a sample model of observations, which are not used to estimate a regression analysis model. PRESS is calculated as a sum of all predicted residual error squares and selects a model with a smallest value.

$$\sum_{i=1}^{n}(y_i - \hat{y}_{i,-i})^2 \quad \text{[Formula 16]}$$

Statistic values have been described which are intended to select an optimal model among various models of a multiple regression analysis by implementing a variables selection method as a method of solving the problem of multicollinearity in the multiple regression analysis.

Hereinafter, an analysis process of applying such an optimal model of multiple regression analysis for prediction user response time will be described according to an embodiment of the present disclosure.

Data applied to this embodiment are nine variables, and a total of 8,812 datasets and data with 8,812×9 matrix are applied. Table 4 shows the types of the data.

TABLE 4

|   | RR_Number of requests received per second | CPU_CPU Usage averaged across cores | Inter_Number of interrupts generated per second | CTXSW_Number of context switches per second | KBin_KB of data received per second | Pktin_Number of packets received per second | KBOut_KB of data sent per second | PKOut_Number of packets sent per second | RT_Response time |
|---|---|---|---|---|---|---|---|---|---|
| 1 | 112.5089893 | 18 | 53.6 | 453.4 | 504.9 | 9.8 | 86.2 | 11 | 74.4 |
| 2 | 82.93458687 | 25 | 75 | 551.9 | 496.3 | 10.7 | 80 | 13.3 | 74.1 |
| 3 | 88.54850704 | 21 | 62.1 | 422.9 | 332.7 | 7.8 | 49 | 10.1 | 48.3 |
| 4 | 73.55775926 | 21 | 62.4 | 458.6 | 388.8 | 9.2 | 69.8 | 11.3 | 63.7 |
| ... | ... | ... | ... | ... | ... | ... | ... | ... | ... |
| 8811 | 72.44257843 | 20 | 59.5 | 445.1 | 373.2 | 8.7 | 63.7 | 10.5 | 58.7 |
| 8812 | 83.00295161 | 18 | 54 | 454.4 | 489.7 | 10.2 | 89.8 | 11.3 | 77.7 |

According to an embodiment of the present disclosure, the analysis result for the multiple regression model $$Y_{RT} = \beta_0 + \beta_1 X_{RRi} + \beta_2 X_{CPUi} + \ldots + \beta_8 X_{PkOuti} + \varepsilon_{ij}, i = 1, 2, \ldots, 8812 (=n)$$

for all the eight explanatory variables is presented in Table 5 below.

TABLE 5

| Model | Unstandardized coefficient B | Standard error | Standardized coefficient Beta | t | Significance probability | 95.0% confidence interval for B Lower limit | 95.0% confidence interval for B Upper limit | Collinearity statistics Tolerance | Collinearity statistics VIF |
|---|---|---|---|---|---|---|---|---|---|
| Constant | .677 | .056 | | 12.015 | .000 | .567 | .788 | | |
| RR_Number of requests received per second | .002 | .000 | .005 | 4.255 | .000 | .001 | .003 | .135 | 7.417 |
| CPU_CPU Usage averaged across cores | −.051 | .014 | −.021 | −3.703 | .000 | −.078 | −.024 | .005 | 193.598 |
| Inter_Number of interrupts generated per second | −.131 | .007 | −.152 | −18.566 | .000 | −.145 | −.117 | .002 | 401.615 |
| CTXSW_Number of context switches per second | .007 | .001 | .044 | 8.567 | .000 | .005 | .008 | .006 | 157.137 |
| KBin_KB of data received per second | −.001 | .000 | −.010 | −4.594 | .000 | −.002 | −.001 | .037 | 26.712 |
| Pktin_Number of packets received per second | −.135 | .002 | −.039 | −73.881 | .000 | −.139 | −.132 | .592 | 1.689 |

TABLE 5-continued

| Model | Unstandardized coefficient | | Standardized coefficient | | 95.0% confidence interval for B | | Collinearity statistics | |
|---|---|---|---|---|---|---|---|---|
| | B | Standard error | Beta | t | Significance probability | Lower limit | Upper limit | Tolerance | VIF |
| KBOut_KB of data sent per second | .632 | .002 | .744 | 386.742 | .000 | .629 | .635 | .045 | 22.157 |
| PKOut_Number of packets sent per second | 2.408 | .028 | .444 | 87.157 | .000 | 2.354 | 2.462 | .006 | 155.248 |

In an analysis result of a multiple regression model according to an embodiment of the present disclosure, when examining statistic values for tolerance and VIF in order to check multicollinearity, six variables with a tolerance statistic value of 0.1 or less have multicollinearity, and statistic values of VIF are equal to or greater than 10 also in six explanatory variables thus show multicollinearity except two explanatory variables of RR (Number of requests received per second) and PktIn (Number of packets received per second). Table 6 below presents the results of every model to which a variables selection method is applied in order to solve multicollinearity.

TABLE 6

Model: all_leg
Dependent Variable: RT
Adjusted R-Square Selection Method

| | | Number of Observations Read | 8812 | | | | |
| | | Number of Observations Used | 8812 | | | | |

| Model Index | Number in Model | Adjusted R-Square | R-Square | C(p) | AIC | BIC | Estimated MSE of Prediction | J(p) |
|---|---|---|---|---|---|---|---|---|
| 1 | 4 | 0.9983 | 0.9983 | 5.0000 | −9465.7097 | −9463.7040 | 0.3416 | 0.3416 |
| 2 | 3 | 0.9983 | 0.9983 | 35.8521 | −9434.9000 | −9432.9253 | 0.3428 | 0.3428 |
| 3 | 3 | 0.9971 | 0.9972 | 6100.856 | −4831.3619 | −4832.9664 | 0.5779 | 0.5779 |
| 4 | 2 | 0.9971 | 0.9971 | 6442.653 | −4632.4123 | −4633.3013 | 0.5911 | 0.5911 |
| 5 | 3 | 0.9734 | 0.9734 | 130190.6 | 14843.6116 | 14836.3643 | 5.3896 | 5.3896 |
| 6 | 2 | 0.9719 | 0.9719 | 138342.6 | 15343.9682 | 15338.5599 | 5.7045 | 5.7045 |
| 7 | 2 | 0.9655 | 0.9655 | 171855.6 | 17152.0361 | 17146.5191 | 7.0037 | 7.0037 |
| 8 | 1 | 0.9653 | 0.9653 | 172509.4 | 17181.9680 | 17178.3521 | 7.0275 | 7.0275 |
| 9 | 3 | 0.7909 | 0.7910 | 1084729 | 33020.4254 | 33012.5220 | 42.4027 | 42.4027 |
| 10 | 2 | 0.7902 | 0.7902 | 1088713 | 33050.4896 | 33044.5698 | 42.5476 | 42.5476 |
| 11 | 2 | 0.7318 | 0.7318 | 1394108 | 35213.8251 | 35207.8878 | 54.3868 | 54.3868 |
| 12 | 1 | 0.7119 | 0.7119 | 1498105 | 35841.9897 | 35838.0364 | 58.4053 | 58.4053 |
| 13 | 2 | 0.7035 | 0.7035 | 1542140 | 36097.7917 | 36091.8484 | 60.1256 | 60.1256 |
| 14 | 1 | 0.7027 | 0.7027 | 1546470 | 36120.3669 | 36116.4121 | 60.2798 | 60.2798 |
| 15 | 1 | 0.2757 | 0.2757 | 3779999 | 43966.5470 | 43962.5656 | 146.8475 | 146.8475 |

| Model Index | MSE | Prediction Criterion | Root MSE | SBC | S(p) | Variables in Model |
|---|---|---|---|---|---|---|
| 1 | 0.34138 | 0.0017 | 0.58428 | −9430.29031 | 0.00003877 | KBIn Pktin KBOut PkOut |
| 2 | 0.34262 | 0.0017 | 0.58534 | −9406.56456 | 0.00003890 | Pktin KBOut PkOut |
| 3 | 0.57769 | 0.0029 | 0.76006 | −4803.02646 | 0.00006559 | KBIn KBOut PkOut |
| 4 | 0.59094 | 0.0029 | 0.76873 | −4611.16070 | 0.00006709 | KBOut PkOut |
| 5 | 5.38719 | 0.0266 | 2.32103 | 14872 | 0.00061169 | KBIn Pktin KBOut |
| 6 | 5.70258 | 0.0281 | 2.38801 | 15365 | 0.00064743 | KBIn KBOut |
| 7 | 7.00133 | 0.0346 | 2.64600 | 17173 | 0.00079488 | Pktin KBOut |
| 8 | 7.02595 | 0.0347 | 2.65065 | 17196 | 0.00079759 | KBOut |
| 9 | 42.38343 | 0.2092 | 6.51026 | 33049 | 0.00481 | KBIn Pktin PkOut |
| 10 | 42.53310 | 0.2099 | 6.52174 | 33072 | 0.00483 | KBIn PkOut |
| 11 | 54.36831 | 0.2684 | 7.37349 | 35235 | 0.00617 | Pktin PkOut |
| 12 | 58.39206 | 0.2882 | 7.64147 | 35856 | 0.00663 | PkOut |
| 13 | 60.10514 | 0.2967 | 7.75275 | 36119 | 0.00682 | KBIn Pktin |
| 14 | 60.26615 | 0.2974 | 7.76313 | 36135 | 0.00684 | KBIn |
| 15 | 146.81420 | 0.7246 | 12.11669 | 43981 | 0.01667 | Pktin |

The above results of an embodiment of the present disclosure show selection criterion statistic values of various multiple regression models for which a variables selection method is selected to solve the problem of multicollinearity. In addition, final results of 15 multiple regression analysis models are presented which are obtained by automatic sequencing statistics of adjusted R-squared ADJRSQ among the criterion statistic values.

In the above embodiment, when criterion statistic values for selecting a final model by a variables selection method are compared, Model 1 is ultimately selected as an optimal multiple regression model. Accordingly, it may be known that an optimal multiple regression equation thus selected is determined as $$\hat{Y}_{RT} = \hat{\beta}_0 + \hat{\beta}_1 X_{KBIni} + \hat{\beta}_2 X_{Pktini} + \hat{\beta}_3 X_{KBOuti} + \hat{\beta}_4 X_{PkOuti}$$

Thus, since the F-test results are significant in testing the goodness of fit of the multiple regression model according to an embodiment of the present disclosure, the multiple regression model, which is finally selected in the embodiment of the present disclosure, is valid.

An implementation method according to an embodiment of the present disclosure is implemented by an algorithm for user response time (RT) prediction at S50 (AI and analysis platform) using data that are collected by S40 (Big-data platform) of the representative drawing 1.

When a result of a model for a final optimal multiple regression analysis is derived as above, a corresponding report automatically generates natural languages as shown below in an analysis report of a result of a final model by means of S50 (AI and analysis platform) module for natural language generation (NLG), which is referred to as augmented analysis (AA), so that an analysis report including automatically generated natural languages of analysis results, which are easy to understand to non-experts of big data, may be provided to an operator.

In an embodiment of the present disclosure, such a natural language as outcome of an augmented analysis, which is automatically generated in a final analysis report, may be provided at the bottom of the analysis report, as shown in Table 8 below.

TABLE 7

Model: MODEL5
Dependent Variable: RT RT

| | | |
|---|---|---|
| Number of Observations Read | | 8812 |
| Number of Observations Used | | 8812 |

Analysis of Variance

| Source | DF | Sum of Squares | Mean Square | F Value | Pr > F |
|---|---|---|---|---|---|
| Model | 4 | 1782873 | 445718 | 1305626 | <.0001 |
| Error | 8807 | 3006.55704 | 0.34138 | | |
| Corrected Total | 8811 | 1785879 | | | |

| | | | | |
|---|---|---|---|---|
| Root MSE | 0.58428 | R-Square | 0.9983 | |
| Dependent Mean | 63.00925 | Adj R-Sq | 0.9983 | |
| Coeff Var | 0.92729 | | | |

Parameter Estimates

| Variable | Label | DF | Parameter Estimate | Standard Error | t Value | Pr > Itl | Tolerance | Variance Inflation |
|---|---|---|---|---|---|---|---|---|
| Intercept | Intercept | 1 | 1.06510 | 0.02876 | 37.04 | <.0001 | . | 0 |
| KBIn | KBIn | 1 | 0.00068161 | 0.00011892 | 5.73 | <.0001 | 0.24317 | 4.11232 |
| Pktin | Pktin | 1 | −0.14848 | 0.00190 | −78.09 | <.0001 | 0.62957 | 1.58838 |
| KBOut | KBOut | 1 | 0.68353 | 0.00065629 | 1041.50 | <.0001 | 0.32032 | 3.12185 |
| PkOut | PkOut | 1 | 1.45485 | 0.00403 | 360.82 | <.0001 | 0.34642 | 2.88670 |

According to an embodiment of the present disclosure, Table 7 shows a result of an individual T-test for a parameter estimated for the model ($\hat{Y}_{RT} = \hat{\beta}_0 + \hat{\beta}_1 X_{KBIni} + \hat{\beta}_2 X_{Pktini} + \hat{\beta}_3 X_{KBOuti} + \hat{\beta}_4 X_{PkOuti}$), which is ultimately selected as the optimal multiple regression model, and results of an F-test that tests the goodness of fit of the selected multiple regression model. As every t-test result for each parameter is significant, a linear equation may be obtained with a parameter estimate that is not zero. In addition, as for statistic values for tolerance and VIF, which are intended to examine multicollinearity for a selected explanatory variable, all the four explanatory variables show no violation in statistic values.

TABLE 8

Model: MODEL5
Dependent Variable: RT RT

| | | |
|---|---|---|
| Number of Observations Read | 8812 | |
| Number of Observations Used | 8812 | |

Analysis of Variance

| Source | DF | Sum of Squares | Mean Square | F Value | Pr > F |
|---|---|---|---|---|---|
| Model | 4 | 1782873 | 445718 | 1305626 | <.0001 |
| Error | 8807 | 3006.55704 | 0.34138 | | |
| Corrected Total | 8811 | 1785879 | | | |

| | | | | |
|---|---|---|---|---|
| Root MSE | 0.58428 | R-Square | 0.9983 | |
| Dependent Mean | 63.00925 | Adj R-Sq | 0.9983 | |
| Coeff Var | 0.92729 | | | |

Parameter Estimates

| Variable | Label | DF | Parameter Estimate | Standard Error | t Value | Pr > Itl | Tolerance | Variance Inflation |
|---|---|---|---|---|---|---|---|---|
| Intercept | Intercept | 1 | 1.06510 | 0.02876 | 37.04 | <.0001 | . | 0 |
| KBIn | KBIn | 1 | 0.00068161 | 0.00011892 | 5.73 | <.0001 | 0.24317 | 4.11232 |
| Pktin | Pktin | 1 | −0.14848 | 0.00190 | −78.09 | <.0001 | 0.62957 | 1.58838 |
| KBOut | KBOut | 1 | 0.68353 | 0.00065629 | 1041.50 | <.0001 | 0.32032 | 3.12185 |
| PkOut | PkOut | 1 | 1.45485 | 0.00403 | 360.82 | <.0001 | 0.34642 | 2.88670 |

As a result of individual T-test of an optimal model, all the parameter estimates $\beta_0, \beta_1, \beta_2, \beta_3, \beta_4$ are determined to be significant, and the test of F-test for the goodness of fit of the optimal model is also significant. Accordingly, based on the multiple regression model analysis, the optimal model is determined to be a complete optimal model.

When response time (RT) for a user service request is predicted using the optimal multiple regression model $$Y_{RT} = \beta_0 + \beta_1 X_{KBIn} + \beta_2 X_{PktIn} + \beta_3 X_{KBOut} + \beta_4 X_{PkOut} + \varepsilon_{ij}, = 1, 2, \ldots, 8812 (=n)$$

according to an embodiment of the present disclosure, values of four explanatory variables may be applied to each of five parameter estimates. Thus, RT estimates for 10 new datasets and an upper bound and a lower bound with 95% confidence interval may be automatically obtained as shown in Table 9.

TABLE 9

| OBS | RR | CPU | Inter | CTXSW | KBIn | Pktin | KBOut | PktOut | RT | PRE_1 | LMCI_1 | UMCI_1 |
|---|---|---|---|---|---|---|---|---|---|---|---|---|
| 8796 | 60.9586986 | 14 | 42.0 | 314.4 | 247.2 | 5.9 | 40.0 | 7.5 | 38.6 | 38.61002 | 38.58514 | 38.63489 |
| 8797 | 62.9685431 | 11 | 34.2 | 277.6 | 244.3 | 5.0 | 35.8 | 6.1 | 33.9 | 33.83407 | 33.80564 | 33.86249 |
| 8798 | 79.0276553 | 26 | 76.1 | 553.1 | 477.4 | 10.9 | 79.6 | 3.4 | 73.6 | 73.67581 | 73.65948 | 73.69214 |
| 8799 | 70.7514369 | 22 | 64.9 | 480.9 | 402.3 | 9.3 | 68.5 | 11.5 | 63.6 | 63.51082 | 63.49731 | 63.52434 |
| 8800 | 72.0589649 | 22 | 65.8 | 483.6 | 409.7 | 10.0 | 75.7 | 12.0 | 68.8 | 69.06075 | 69.04357 | 69.07794 |
| 8801 | 70.5206116 | 12 | 35.4 | 355.2 | 387.6 | 7.7 | 73.8 | 8.0 | 62.5 | 62.26908 | 62.23914 | 62.29902 |
| 8802 | 70.7507573 | 23 | 70.5 | 526.8 | 456.0 | 10.1 | 75.7 | 12.3 | 69.8 | 69.51392 | 69.50041 | 69.52743 |
| 8803 | 82.9808844 | 14 | 42.7 | 395.3 | 464.3 | 9.3 | 88.1 | 9.8 | 74.2 | 74.47696 | 74.44454 | 74.50938 |
| 8804 | 150.2687673 | 24 | 70.1 | 464.2 | 414.5 | 9.0 | 55.9 | 11.6 | 54.8 | 55.09673 | 55.07625 | 55.11722 |
| 8805 | 96.8977180 | 26 | 77.5 | 554.6 | 506.0 | 11.0 | 80.8 | 13.7 | 75.0 | 74.93715 | 74.92028 | 74.95401 |
| 8806 | 69.0723202 | 22 | 67.0 | 506.6 | 420.5 | 9.9 | 76.4 | 12.1 | 69.4 | 69.70691 | 69.69058 | 69.72325 |
| 8807 | 75.8107655 | 14 | 42.7 | 405.7 | 470.5 | 9.2 | 88.9 | 9.6 | 74.9 | 74.75188 | 74.71729 | 74.78648 |
| 8808 | 61.9005349 | 4 | 13.0 | 143.9 | 162.9 | 3.2 | 26.5 | 2.8 | 23.0 | 22.88804 | 22.84674 | 22.92933 |
| 8809 | 76.6891502 | 25 | 73.6 | 544.7 | 475.5 | 10.8 | 79.5 | 13.2 | 73.2 | 73.33004 | 73.31429 | 73.34580 |
| 8810 | 151.1761324 | 28 | 83.8 | 571.2 | 561.6 | 11.1 | 77.3 | 14.2 | 73.3 | 73.29528 | 73.27143 | 73.31912 |
| 8811 | 72.4425784 | 20 | 59.5 | 445.1 | 373.2 | 8.7 | 63.7 | 10.5 | 58.7 | 58.84430 | 58.83064 | 58.85795 |
| 8812 | 83.0029516 | 18 | 54.0 | 454.4 | 489.7 | 10.2 | 89.8 | 11.3 | 77.7 | 77.70491 | 77.67864 | 77.73119 |
| 1 | 188.7970316 | 28 | 81.8 | 522.1 | 502.6 | 9.9 | 60.0 | 13.5 | | 60.58983 | 60.55971 | 60.61995 |
| 2 | 171.8639017 | 29 | 83.7 | 573.5 | 558.1 | 11.4 | 79.6 | 14.5 | | 75.25691 | 75.23433 | 75.27950 |
| 3 | 105.9329000 | 23 | 66.7 | 448.7 | 376.4 | 8.3 | 50.7 | 11.4 | | 51.32939 | 51.30587 | 51.35291 |
| 4 | 68.5043671 | 20 | 60.5 | 474.5 | 425.4 | 9.2 | 71.2 | 11.2 | | 64.95048 | 64.93778 | 64.96319 |
| 5 | 62.1097213 | 12 | 35.7 | 267.8 | 211.2 | 5.2 | 33.1 | 6.1 | | 31.93629 | 31.90655 | 31.96602 |
| 6 | 111.5216978 | 22 | 66.0 | 430.3 | 353.3 | 8.1 | 49.1 | 10.8 | | 49.37679 | 49.35421 | 49.39936 |
| 7 | 65.4638095 | 14 | 43.0 | 326.2 | 263.4 | 6.2 | 42.3 | 7.3 | | 39.85766 | 39.83398 | 39.88134 |
| 8 | 90.8784089 | 24 | 71.0 | 512.5 | 461.8 | 10.2 | 74.4 | 12.5 | | 68.90541 | 68.89183 | 68.91899 |
| 9 | 200.9297567 | 33 | 94.6 | 629.9 | 667.1 | 12.8 | 87.1 | 16.3 | | 82.86852 | 82.83796 | 82.90406 |
| 10 | 143.1333858 | 25 | 72.5 | 469.7 | 409.6 | 8.9 | 53.1 | 11.7 | | 53.33985 | 53.31644 | 53.36327 |

Table 9 shows new RT estimates (PRE_1) for additional new 10 explanatory variables and lower bounds (LMCI_1) and upper bounds (UMCI_1) with 95% confidence interval according to an embodiment of the present disclosure.

Accordingly, an operator may automatically execute additional provision of ICT infrastructure resources, which corresponds to orchestration on the operation UI screen, based on a result as to whether or not to add a new resource, which is obtained by comparing RT estimates according to an automatic analysis report and a threshold of quality criterion of application service in operation. Herein, hyper-automation is implemented in which whether or not to add an ICT resource (network bandwidth) is autonomously determined on the operator UI screen without the operator's decision.

Hyper-automation (HA) executes a hyper-automation technique for continuously ensuring the quality of a service, which first compares a RT estimate, which is a result of a user RT prediction result, and a threshold, which is predefined for each subscriber according to a policy of SLA standard, and in case the RT estimate is lower than the threshold, maintains a network bandwidth that is currently provided, and in case the RT is predicted to be higher than the threshold, automatically and autonomously increases the network bandwidth by means of a predefined command using an operator orchestration UI automation command.

Hereinafter, the main contents of the present disclosure described above may be summarized as follows.

The present disclosure provides a technique for continuously ensuring application service quality of a communication device by using data collected in a current state of providing an application service for a user application service request and an estimate of user application service response time. Particularly, a method for predicting response time is a technique of prediction by applying a multiple regression analysis model or a supervised learning algorithm of artificial intelligence (AI) deep learning (DL) as a statistical method. For a system device for predicting response time according to the present disclosure, two big data collection platform device ('big data platform' or 'data collection means') and big data analysis platform device ('AI analysis platform' or 'data analysis means') are applied.

The big data collection platform device is a device that stores and manages various types of telemetry, log files and real-time big data, which are produced by application services of ICT infrastructure (computing server, storage, network) and a virtual network in a cloud virtualization environment.

The big data analysis platform device is equipped with an algorithm for implementing a prediction model based on a statistic analysis algorithm and AI deep learning supervised learning algorithm, which predict a user' application service response time by utilizing big data collected from the big data collection platform device. The big data analysis platform device operates automatically to search for an optimal model and has a function of providing an augmented analysis in the form of a report including natural language generation (NLG) in an automated process on an analysis report of the optimal model.

Also, according to the present disclosure, hyper automation (HA) automatically analyzes RT predictions according to an automated process and autonomously implements every step of process in a form of report including automated natural languages and graphs based on a natural language process (NLP), which is an automated process on a prediction analysis report including graphics and analysis results. Thus, augmented analytics are provided to an operator. In addition, a hyper automation command for automatically comparing a RT prediction value and a predefined threshold of each user and determining whether to increase or decrease a network bandwidth is executed by a command that is defined beforehand by a function of operator orchestration.

Also, a technique, which the present disclosure intends to provide, includes a technique of continuously ensuring the quality of an application service by using an augmented analysis, which automatically generates natural languages on an analysis report after analyzing an optimal response time prediction model for data applied in a current state of providing an application service at a user application service request and for a user's new application service request, and by using a hyper-automation technique of automatically determining whether or not to increase a network bandwidth based on a user response time prediction at operator UI orchestration.

Figure 7:
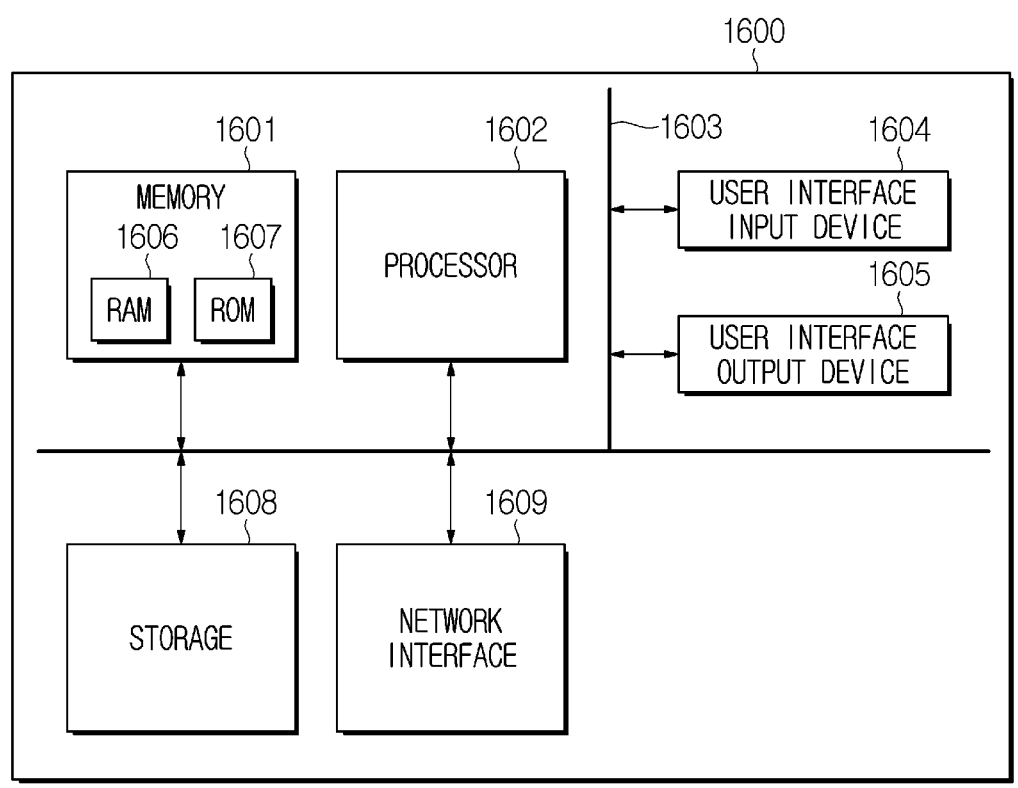
FIG. 7 is a view illustrating a configuration of a response time predictive analyzer according to another embodiment of the present disclosure.

FIG. 7 is a view illustrating a configuration of a response time predictive analyzer according to another embodiment of the present disclosure. Specifically, FIG. 7 is a block diagram exemplifying a computing system that implements a response time predictive analysis method according to an embodiment of the present disclosure.

Referring to FIG. 7, a computing system 1600 may include at least one processor 1602, a memory 1601, a user interface input device 1604, a user interface output device 1605, a storage 1608, and a network interface 1609, that are connected via a bus 1603.

The processor 1602 may be a semi-conductor device executing the processing of commands stored in a central processing unit (CPU) or the memory 1601 and/or the storage 1608. The memory 1601 and the storage 1608 may include various types of volatile or non-volatile storage media. For example, the memory 1601 may include a read only memory (ROM) and a random access memory (RAM).

Accordingly, steps of a method or an algorithm described in relation to embodiments of the present disclosure may be directly implemented by hardware, which is executed by the processor 1602, a software module, or a combination of these two. A software module may reside in a storage medium (that is, the memory 1601 and/or the storage 1608) like RAM, flash memory, ROM, EPROM, EEPROM, register, hard disk, removable disk, and CD-ROM. An exemplary storage medium is coupled with the processor 1602, and the processor 1602 may read information from a storage medium and may write information into a storage medium. In another method, a storage medium may be integrated with the processor 1602. A processor and a storage medium may reside in an application-specific integrated circuit (ASIC). An ASIC may reside in a user terminal. In another method, a processor and a storage medium may reside in a user terminal as individual components.

The various embodiments of the disclosure are not intended to be all-inclusive and are intended to illustrate representative aspects of the disclosure, and the features described in the various embodiments may be applied independently or in a combination of two or more.

Also, the various embodiments of the present invention may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

It will be apparent to those skilled in the art that various substitutions, modifications and changes are possible are possible without departing from the technical features of the present disclosure. It is therefore to be understood that the scope of the present disclosure is not limited to the above-described embodiments and the accompanying drawings.

What is claimed is:

1. A method for predicting application service response time in a communication system, the method comprising:
    collecting network data associated with the application service in response to a user application service request of a user device;
    performing data analysis for a response time predictive analysis to predict a user's application service response time based on the collected network data; and
    based on the predicted response time being lower than a predefined threshold, providing continuous service quality assurance by increasing a bandwidth of the communication system,
    wherein the performing data analysis selects an optimal prediction model by initially applying a response time prediction model and testing the initial prediction model that is applied,
    wherein the performing data analysis applies a multiple regression analysis (MRA) model for analyzing, and
    wherein the collected network data comprises 9 variable values for response time Yi, number of requests received per second X1, CPU usage averaged across cores X2, number of interrupts generated per second X3, number of context switches per second X4, KB of data received per second X5, number of packets received per second X6, KB of data sent per second X7, and number of packets sent per second X8.

2. The method of claim 1, wherein a predictive analysis report is generated by performing graph and natural language generation (NLG) on a predictive analysis result for response time based on the multiple regression analysis model.

3. The method of claim 2, wherein augmented analytics by natural language generation is performed on the predictive analysis report.

4. The method of claim 3, further comprising hyper automation in which the predictive analysis report is utilized and a network bandwidth is automatically increased or decreased by comparing a value of the response time prediction and a threshold that is predefined for each user.

5. The method of claim 1, wherein the performing data analysis is configured to comprising:
    a first step of selecting a response time prediction model;
    a second step of estimating a parameter of the prediction model;
    a third step of testing goodness of fit of the prediction model;
    a fourth step of testing a hypothesis of an applied model when the goodness of fit of the prediction model is tested; and
    a fifth step of measuring final goodness of fit, when both the third step and the fourth step determine that goodness of fit is satisfied.

6. The method of claim 5, further comprising a sixth step of selecting another prediction model, when goodness of fit is not satisfied in any one of the third step, the fourth step and the fifth step.

7. The method of claim 6, wherein the sixth step selects another prediction model by varying a variable of the prediction model that is selected in the first step.

8. The method of claim 6, wherein the first step or the sixth step utilizes any one among stepwise variable selection, forward selection and backward elimination as a variables selection method for selecting an optimal model.

9. The method of claim 6, the first step or the sixth step selects an optimal prediction model by using a reference statistic value.

10. The method of claim 1, wherein the performing data analysis, for the collected network data, performs one or more among log analysis, packet inspection, packet flow monitoring, and telemetry and root analysis and predicts response time based on an operation of a network, which is related to at least one of payload, protocol, bandwidth and link connection.

11. The method of claim 1, wherein the performing data analysis performs a variables selection analysis when a multicollinearity problem occurs among prior 8 explanatory variables in the multiple regression analysis model.

12. The method of claim 1, wherein the performing data analysis comprises detecting whether the collected data has one or more anomalies among point anomaly, collective anomaly and contextual anomaly.

13. The method of claim 1, further comprising postprocessing which compares the predicted response time and the predefined threshold and manages the predicted response time to be within the predefined threshold.

14. An apparatus for predicting application service response time in a communication system, the apparatus comprising:
    a data collection means of collecting and storing network data associated with a user application service, in response to a request of the application service by a user device; and
    a data analysis means of performing a response time predictive analysis, in order to predict a user's application service response time, by using the collected data,
    wherein the data analysis means applies initially a response time prediction model and selects an optimal prediction model by testing the applied initial prediction model,
    wherein the data analysis means applies a multiple regression analysis (MRA) model for analyzing,
    wherein the collected network data comprises 9 variable values for response time Yi, number of requests received per second X1, CPU usage averaged across cores X2, number of interrupts generated per second X3, number of context switches per second X4, KB of data received per second X5, number of packets received per second X6, KB of data sent per second X7, and number of packets sent per second X8, and
    wherein the data collection means is configured to perform the response time predictive analysis with operations including, based on the predicted response time being lower than a threshold, providing continuous service quality assurance by increasing a bandwidth of the communication system.

15. A system for predicting application service response time in a communication system, the system comprising:

a user device configured to request a user application service;

a big-data collection platform that collects and stores network data associated with the user application service in response to a user application service request of the user device;

a big-data analysis platform that performs a response time predictive analysis by utilizing the collected data in order to predict a user's application service response time, wherein the big-data analysis platform applies initially a response time prediction model and selects an optimal prediction model by testing the initial prediction model that is applied; and a master device that compares the predicted response time and a predefined threshold and manages the predicted response time to be within the predefined threshold, wherein the big-data analysis platform applies a multiple regression analysis (MRA) model for analyzing, wherein the collected network data comprises 9 variable values for response time Yi, number of requests received per second X1, CPU usage averaged across cores X2, number of interrupts generated per second X3, number of context switches per second X4, KB of data received per second X5, number of packets received per second X6, KB of data sent per second X7, and number of packets sent per second X8, and wherein the big-data analysis platform is configured to perform the response time predictive analysis with operations including, based on the predicted response time being lower than the predefined threshold, providing continuous service quality assurance by increasing a bandwidth of the communication system.

* * * * *